(12) United States Patent
Matsushita et al.

(10) Patent No.: US 6,893,189 B2
(45) Date of Patent: May 17, 2005

(54) PIPELAYER

(75) Inventors: Shigenori Matsushita, Kyoto (JP); Morio Tsuchie, Shijonawate (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 10/726,115

(22) Filed: Dec. 1, 2003

(65) Prior Publication Data

US 2004/0190995 A1 Sep. 30, 2004

(30) Foreign Application Priority Data

Mar. 24, 2003 (JP) .......................................... 2003-080956

(51) Int. Cl.$^7$ .......................... E03F 3/06; B66C 23/00; B66F 9/00
(52) U.S. Cl. ................... 405/155; 405/184.1; 212/261; 212/289; 414/686
(58) Field of Search ................................ 405/155, 154, 405/1, 174, 231, 232; 212/289, 258, 261, 262; 414/686, 687, 692

(56) References Cited

U.S. PATENT DOCUMENTS

| | | | | |
|---|---|---|---|---|
| 2,301,808 A | * | 11/1942 | Mosher ....................... | 212/262 |
| 3,094,221 A | * | 6/1963 | Galuska ....................... | 212/280 |
| 3,722,707 A | * | 3/1973 | Hedeen et al. ............... | 212/281 |
| 3,785,503 A | | 1/1974 | Butterfield et al. | |
| 3,941,252 A | | 3/1976 | Six et al. | |
| 3,977,547 A | * | 8/1976 | Holopainen ................. | 414/687 |
| 3,990,583 A | | 11/1976 | Nishida et al. | |
| 4,098,492 A | * | 7/1978 | Wilkinson ................... | 254/399 |
| 4,172,688 A | * | 10/1979 | Cecchi et al. ............... | 212/258 |
| 4,179,233 A | * | 12/1979 | Bromell et al. ........... | 414/138.3 |
| 4,191,502 A | * | 3/1980 | Komatsu .................. | 414/141.6 |
| 4,277,053 A | * | 7/1981 | Simon ........................ | 254/326 |
| 4,565,292 A | * | 1/1986 | Spengel, Sr. ................ | 212/232 |
| 4,598,829 A | * | 7/1986 | Young et al. ............... | 212/284 |
| 4,923,269 A | * | 5/1990 | Healey ........................ | 349/196 |
| 5,120,186 A | * | 6/1992 | Jorgenson ................... | 414/686 |
| RE34,576 E | * | 4/1994 | Camilleri .................... | 405/267 |
| 5,445,281 A | * | 8/1995 | Hung ......................... | 212/285 |
| 5,626,438 A | * | 5/1997 | Etheridge ................... | 405/158 |
| 6,609,622 B2 | * | 8/2003 | Forsyth ..................... | 212/258 |

FOREIGN PATENT DOCUMENTS

| | | |
|---|---|---|
| JP | 49-24620 | 6/1974 |
| JP | 49-100746 | 9/1974 |
| JP | 49-100747 | 9/1974 |
| JP | 49-111971 | 9/1974 |
| JP | 50-67607 | 6/1975 |
| JP | 52-100669 | 7/1977 |
| JP | 60-13960 | 4/1985 |

\* cited by examiner

*Primary Examiner*—Jong-Suk Lee
(74) *Attorney, Agent, or Firm*—Frishauf, Holtz, Goodman & Chick, P.C.

(57) ABSTRACT

A pipelayer is provided which is capable of effectively transporting pipes or the like and stably carrying out load hoisting operation on a slope. The pipelayer comprises: an undercarriage; an upper revolving superstructure mounted on the undercarriage so as to turn around freely upon the undercarriage; a boom supported by the upper revolving superstructure so as to be freely raised and lowered; a pulley block attached to the boom through a universal joint; a hoist mounted on the upper revolving superstructure; a hoist hook hung by a wire rope that is paid out from the hoist and wound around the pulley block.

8 Claims, 11 Drawing Sheets

PIPELAYER

TECHNICAL FIELD

The present invention relates to a pipelayer particularly suited for use in load hoisting operation when constructing a pipeline for transportation of natural gas, petroleum or the like.

BACKGROUND ART

For transporting natural gas, petroleum or the like, pipelines are often laid under the ground nearby the ground surface. Construction of such pipelines is comprised of a trench digging step for digging a trench in a planned construction site; a pipeline laying step for laying a pipeline in the trench formed in the trench digging step; and a backfill step for filling earth and sand back into the trench in which the pipeline is laid. In the pipeline laying step, the following operations are repeatedly carried out: (a) short pipe transporting operation: short pipes stacked on a material handling vehicle standing by in a working site are moved to a place near the trench and arranged in a line; (b) short pipe joining operation: an adequate number of short pipes, which have been aligned in the place near the trench by the short pipe transporting operation, are joined by welding into a long pipe; and (c) long pipe joining operation: the long pipe prepared by the short pipe joining operation is joined by welding to the pipeline under construction which has been laid in the previous pipeline laying step.

Usually, a pipelayer is mainly used in first and second centering operations. The first centering operation is performed in (a) the short pipe transporting operation and (b) the short pipe joining operation in such a way that the short pipes aligned in the place near the trench are lifted to a level suited for carrying out welding operation and the central axes of the adjacent short pipes are made to coincide with each other. The second centering operation is performed in (c) the long pipe joining operation in such a way that the end of the long pipe to be joined and the end of the laid pipeline to be joined are lifted to a position suited for welding operation and the central axes of these ends are made to coincide with each other. The pipelayer is composed of a crawler-type tractor; a boom supported by the chassis frame of the tractor so as to be freely raised and lowered; a pulley block attached to the distal end of the boom; a hoist mounted on the tractor; and a hoist hook suspended from a wire rope that runs from the hoist so as to be wound over the pulley block. A hoisted load (a short pipe, long pipe or the like) hung by the hoist hook with the help of a binding tool can be raised and lowered by winding and unwinding the wire rope with the hoist.

Examples of the conventional pipelayers include mobile cranes which are self-propelled cranes such as crawler cranes, wheel cranes and track cranes. Any of the mobile cranes is constituted by an undercarriage; an upper revolving superstructure that can freely turn around upon the undercarriage; and a working implement including a boom supported by the upper revolving superstructure so as to be freely raised and lowered. Regarding the working implement, the structure of the boom itself may be of the telescopic type or lattice type, whereas the peripheral of the boom has basically the same structure. In the track crane disclosed in Japanese Patent Kokoku Publication No. 60-13960 for example, the peripheral of the boom is designed as shown in FIG. 11 in which a wire rope 102 extending from a hoist (not shown) mounted on an upper revolving superstructure 101 is wound over a top sheave 104 rotatively supported by the distal end of a boom 103 and over a hook sheave 106 provided for a hook block 105 such that load hoisting operation for raising and lowering a hoisted load W along a radial direction of the top sheave 104 can be smoothly carried out.

This conventional pipelayer has poor working efficiency because the above-described short pipe transporting operation (a) has to be entirely carried out by self-propulsion. The mobile cranes represented by the track crane 100 of Japanese Patent Kokoku Publication No. 60-13960 have a fear that when load hoisting operation including the first and second centering operations is carried out on a slope, an angle of deviation might be caused between the top sheave 104 and the wire rope 102 wound around the top sheave 104 so that the wire rope 102 deflects from the top sheave 104, resulting in malfunction.

The invention is directed to overcoming the foregoing drawbacks and a primary object of the invention is therefore to provide a pipelayer capable of transporting pipes or the like with high efficiency and stably carrying out load hoisting operation on a slope.

DISCLOSURE OF THE INVENTION

The above object can be accomplished by a pipelayer according to the invention, the pipelayer comprising:

an undercarriage;

an upper revolving superstructure mounted on the undercarriage so as to turn around freely upon the undercarriage;

a boom supported by the upper revolving superstructure so as to be freely raised and lowered;

a pulley block attached to the boom through a universal joint;

a hoist mounted on the upper revolving superstructure;

a hoisting accessory hung by a wire rope that is paid out from the hoist and wound around the pulley block.

According to the invention, a hoisted load is moved by the turning movement of the upper revolving superstructure as well as the self-propulsion of the undercarriage so that transportation of a pipe or the like can be effectively carried out. In addition, the pulley block is attached to the boom through the universal joint so that even when load hoisting operation is carried out on a slope, the wire rope wound around the pulley block can be kept in a proper winding condition without deflecting from the pulley block and therefore the load hoisting operation on a slope can be stably performed.

Preferably, the boom of the invention is of a single tubular-box-type structure. The boom of the single tubular-box-type structure has improved strength because of its simple, lightweight structure and therefore is suited for use in pipe laying operation and the like in which the pipelayer does not need to hoist a load placed far from it nor does it need to hoist a load high, but is required to have high hoisting ability.

In the invention, the fulcrum of the boom relative to the upper revolving superstructure is preferably located in front of an operator's seat installed in the upper revolving superstructure. With this arrangement, the side view can be properly kept without being blocked by the boom so that the operator can visually check whether the operation is going on according to an instruction given by the hoistman.

In the invention, a derricking system for the boom is preferably designed to raise or lower the boom through expansion and contraction of hydraulic cylinders. If a boom derricking system designed to raise or lower the boom through operation of a derricking hoist (derricking winch) is used for example, it becomes necessary to employ, in addition to the boom derricking system, a means for restricting the movement of the boom when the boom is about to rise, exceeding a specified allowable angle or a special device for preventing the boom from falling down backward (e.g., boom back stop). Conversely, where the boom derricking system designed to raise or lower the boom through expansion and contraction of hydraulic cylinders is employed like the invention, unexpected situations caused by an excessive rise of the boom can be avoided by a very simple and low-cost arrangement which can be achieved without use of a special device by simply making the hydraulic cylinders come to the stroke end when the boom rises to the maximum allowable degree. The over load protection system (moment limiter) typically used for cranes etc. is designed to compare a load imposed at the time of hoisting operation (i.e., actual load) with a rated total load and actuate a warning means when the actual load has reached a specified percent (e.g., 90%) of the rated total load. In the case of the winch type boom derricking system, data on the tension of the wire rope is required for calculation of the actual load, but such tension data is relatively difficult to detect so that there is a difficulty in construction of the over load protection system. Conversely, in the case of the hydraulic cylinder type boom derricking system such as used in the invention, data on the axle load of the hydraulic cylinders can be used in place of the tension data. The axle load data is calculated based on pressure detection data from pressure sensors for detecting the pressures of the oil chambers on the head side and bottom side of the hydraulic cylinders respectively. The detection of the hydraulic pressures by the pressure sensors is relatively easy so that the over load protection system can be easily constructed.

In the invention, a path for the wire rope is preferably disposed on a side of the operator's seat located in the upper revolving superstructure. With this arrangement, the operator can watch the movement of the wire rope so that the amount of raising and lowering the hoisted load can be obtained through visual estimation of the amount of winding and unwinding the wire rope with the hoist. This offers such a benefit that the height of the hoisted load can be easily adjusted.

In this case, guide sheaves for guiding the wire rope are preferably disposed on a side of the operator's seat. This makes it possible to estimate the amount of raising and lowering the hoisted load from the amount of peripheral movement of the guide sheaves and the moving amount of the wire rope so that the height of the hoisted load can be more accurately adjusted. For further accuracy, the guide sheaves may be provided with a display unit composed of an indicator, scale marks and others.

BEST MODE FOR CARRYING OUT THE INVENTION

Referring now to the accompanying drawings, a pipelayer will be concretely described according to preferred embodiments of the invention.

Figure 1:
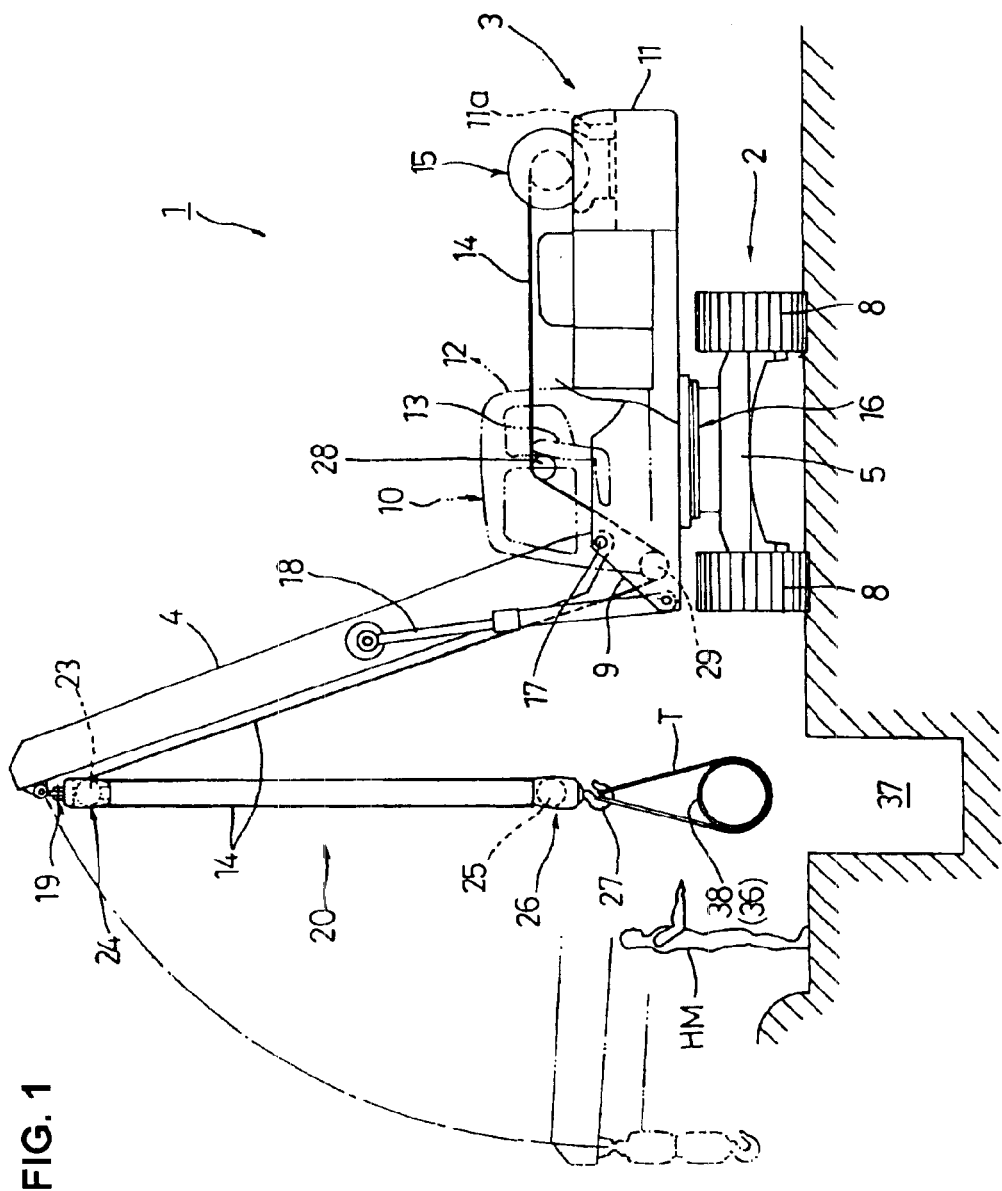
FIG. 1 is a side view showing a pipelayer in operation according to a first embodiment of the invention.
Figure 2:
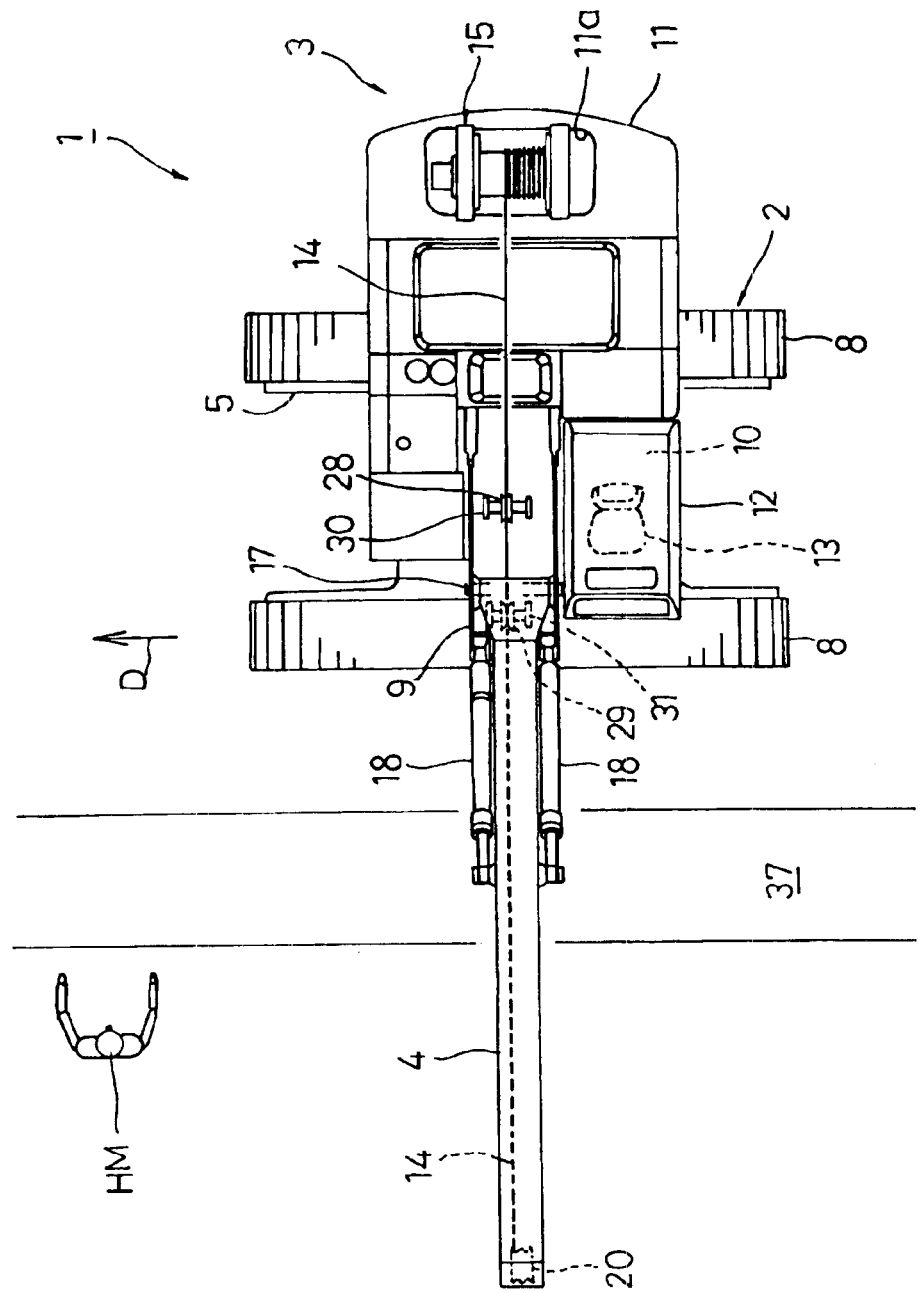
FIG. 2 is a plan view showing the pipelayer in operation.
Figure 3:
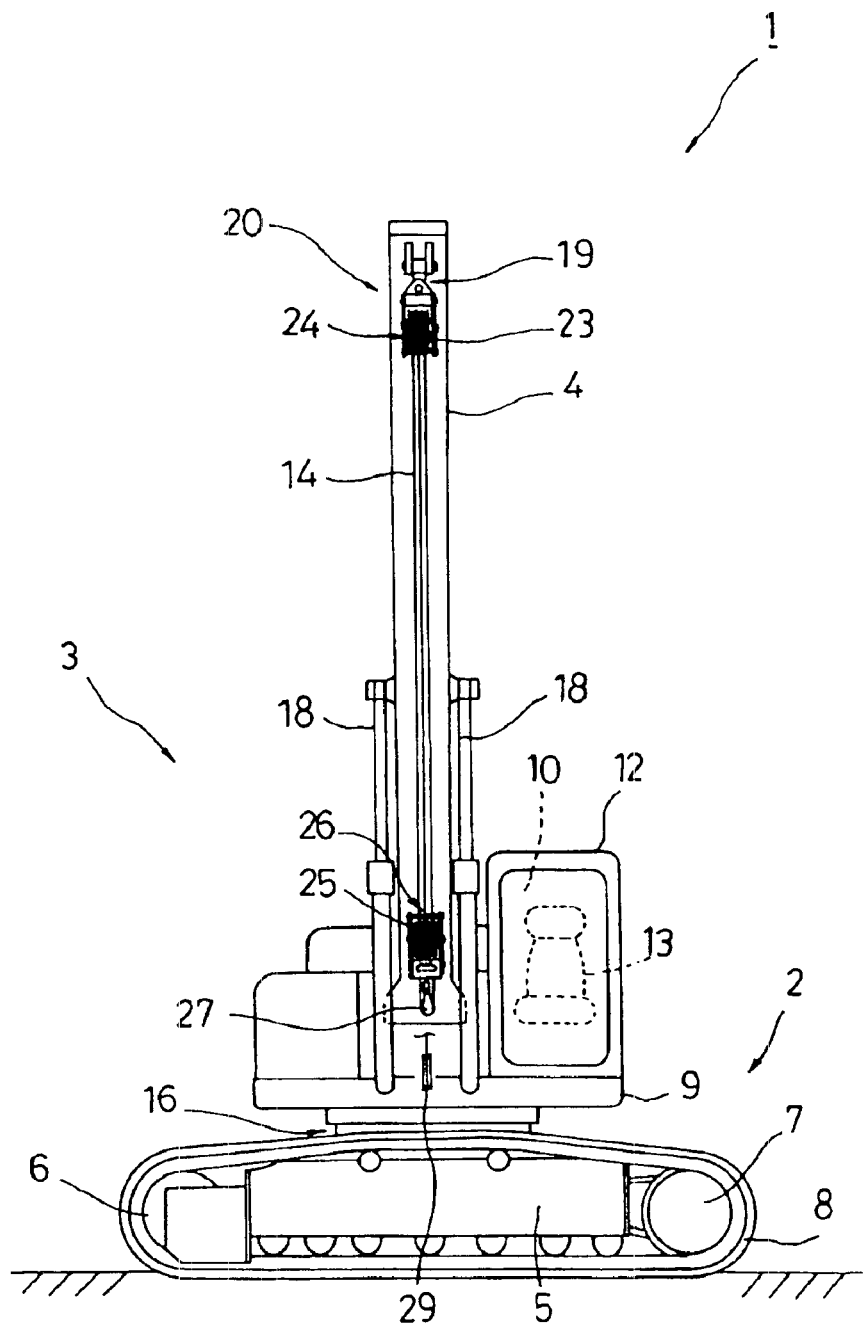
FIG. 3 is a front view showing the pipelayer in operation.
Figure 4:
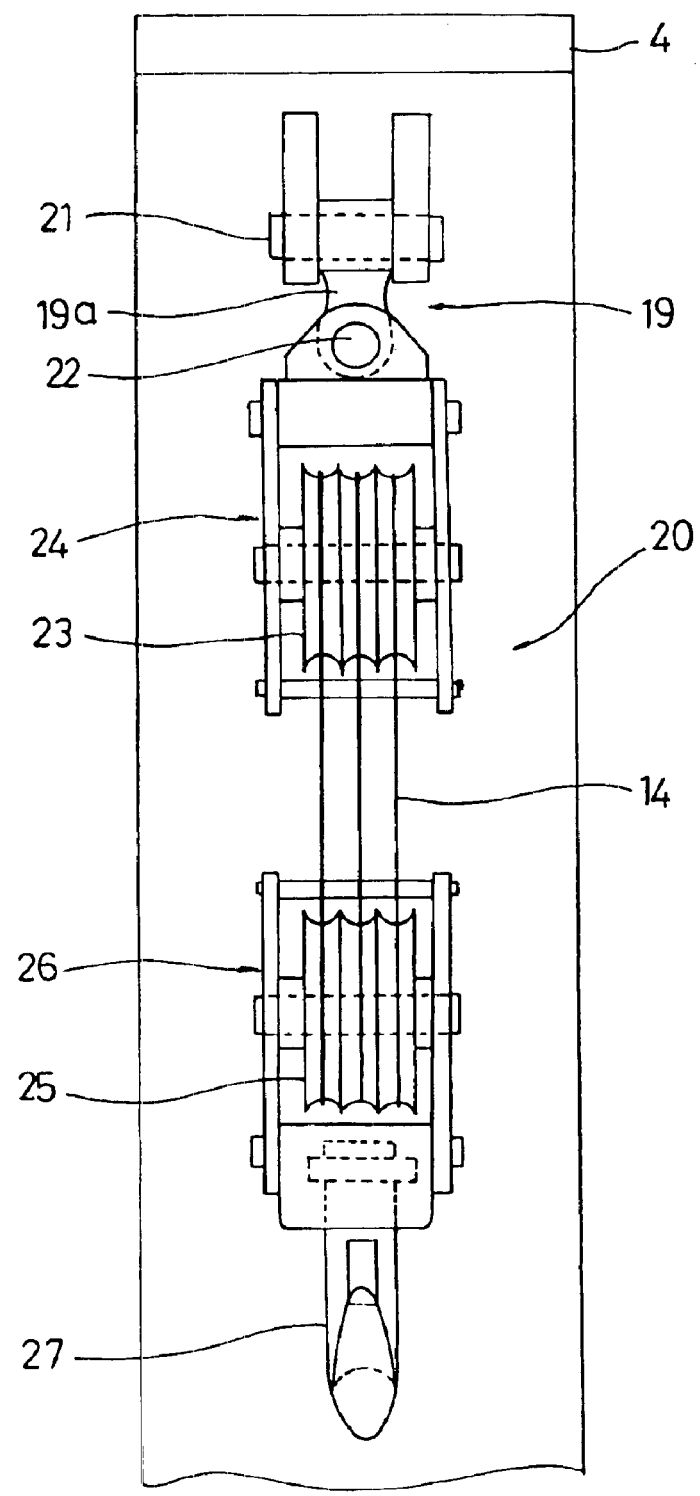
FIG. 4 is an explanatory diagram showing a pulley block and its mounting structure.

FIG. 1 is a side view showing a pipelayer in operation according to a first embodiment of the invention. FIGS. 2 and 3 are a plan view and front view, respectively, showing this pipelayer in operation. FIG. 4 is an explanatory diagram showing a pulley block and its mounting structure.

The pipeline of this embodiment is used for transporting natural gas, petroleum or the like and laid under the ground nearby the ground surface. This pipeline is laid through a trench digging step for digging a trench, for example, with a hydraulic excavator in a planned construction site; a pipeline laying step for laying a pipeline in the trench formed in the trench digging step; and a backfill step for filling earth and sand back into the trench in which the pipeline is laid. The pipelayer of the present embodiment described below is used mainly in the pipeline laying step.

The pipelayer 1 of the first embodiment comprises a crawler-type undercarriage 2, an upper revolving superstructure 3 mounted on the undercarriage 2 so as to turn around freely upon the undercarriage 2, and a boom 4 supported by the upper revolving superstructure 3 so as to be freely raised and lowered.

The undercarriage 2 includes a track frame 5 which mainly constitutes the main body part of the undercarriage 2 and crawler belts 8 which are wound around idler sprockets (idle wheels) 6 and drive sprockets (drive wheels) 7 located on the right and left of the track frame 5. The undercarriage 2 is designed to travel in back and forth directions, steer, and make a spin turn through the going-around movement of the crawler belts 8 which are actuated by drive control of a hydraulic traction motor (not shown) mounted on each drive sprocket 7 through a reduction gear (not shown). By virtue of the crawler-type undercarriage 2 having high road ability and high operational stability, the pipelayer 1 can properly perform operation on an unleveled land, slope and soft ground. It should be noted that "the back and forth directions" used herein are directions parallel to the winding direction of the crawler belts 8.

The upper revolving superstructure 3 includes various systems mounted on a turning frame 9 which forms the framework of the upper revolving superstructure 3. In the upper revolving superstructure 3, there are provided the boom 4 at the front middle part and an operator's cab 10 at the front left part. In the upper revolving superstructure 3, a hydraulic unit (not shown) is provided at the center, and an engine (not shown), a variable displacement type hydraulic pump (not shown) driven by the engine and a counterweight 11 are provided at the rear part. The operator's cab 10 is formed such that a cab 12 constituted by front, rear and side walls and a window of a specified size in the ceiling is mounted on the deck of the turning frame 9. The operator's cab 10 is provided with an operator's seat 13, operating instruments (not shown), measuring gauges (not shown) and others. Although a detailed illustrative explanation is skipped, there is provided a desired hydraulic driving circuit constituted by (i) hydraulic actuators (a hydraulic traction motor; a hydraulic motor for turning the upper revolving superstructure; hydraulic cylinders for derricking the boom; and a hydraulic motor for driving the hoist) using pressure oil supplied from the hydraulic pump as a driving source, (ii) a directional control valve and pressure control valve which constitute the hydraulic unit, (iii) a flow control valve, (iv) ancillary equipment and (v) pipes and wires for connecting these hydraulic devices. The hydraulic driving circuit is controlled by operating the operating instruments disposed in the operator's cab 10. The counterweight 11 has a recessed portion 11a at the center of the upper face thereof. Disposed in the recessed portion 11a is a hoist (winch) 15 composed of a drum for taking a wire rope 14 up and a hydraulic hoist driving motor for rotatively driving the drum.

The undercarriage 2 and the upper revolving superstructure 3 are connected to each other by a swivel 16. Although a detailed explanation on the swivel 16 with reference to the drawings is skipped herein, the swivel 16 comprises a turning circle for supporting the upper revolving superstructure 3 on the track frame 5 of the undercarriage 2 so as to be turnable; a pinion meshing with an inner tooth incised in the turning circle; and a hydraulic turning motor which applies a rotary force to the pinion through a reduction gear and is designed to allow the upper revolving superstructure 3 to turn around upon the undercarriage 2 by drive control of the hydraulic turning motor. The turning movement of the upper revolving superstructure 3 allows changes in the operating direction and the movement of the hoisted load. The swivel 16 is provided with a turn lock mechanism (not shown) for preventing the upper revolving superstructure 3 from turning owing to the load imposed when the turning movement is stopped and hoisting operation is started. The turn lock mechanism includes a disk incorporated in the hydraulic turning motor and a retaining mechanism for retaining the disk. The turn lock mechanism is such that when the hydraulic turning motor is stopped, the disk is retained by the retaining mechanism to fix the rotary shaft of the hydraulic turning motor so as not to rotate, and when hydraulic pressure is introduced into the hydraulic turning motor, thereby allowing the motor to start rotation, part of the hydraulic pressure is introduced into the retaining mechanism too so that the rotary shaft of the hydraulic turning motor becomes free. Thanks to the above arrangement, even when the undercarriage 2 starts self-propulsion with a hoisted load, the upper revolving superstructure 3 can stably move the hoisted load without trembling.

The boom 4 is made of a single tubular-box-type member the length of which is determined based on the desired operating radius. The boom 4 is reinforced because a simplified structure and weight saving are achieved by the use of the single tubular-box-shaped structure. Therefore, the boom 4 is suited for use in pipeline laying operation in which the pipelayer does not need to hoist a load placed far from it nor does it need to hoist a load high, but is required to have high hoisting ability.

The proximal end of the boom 4 is coupled to the turning frame 9 of the upper revolving superstructure 3 by a boom foot pin 17 which serves as a fulcrum for the hoisting movement of the boom 4. This fulcrum is located in front of the operator's seat 13 provided for the operator's cab 10. Thus, the view on the right of the operator can be properly kept without being blocked by the boom 4 so that the operator can visually check whether the operation is going on in compliance with an instruction given by the hoistman HM.

The boom derricking system for raising or lowering the boom 4 has a pair of hydraulic cylinders (hereinafter referred to as "boom cylinders") 18 for coupling the boom 4 to the turning frame 9 at the substantial center of each side part thereof. Expansion and contraction of the boom cylinders 18 allows the boom 4 to rise and lower. In this embodiment, a boom back stop means for restricting the standing position of the boom 4 is established by making the boom cylinders 18 come to the stroke end when the boom 4 rises to the maximum allowable degree. In this way, unexpected situations caused by an excessive rise of the boom 4 can be avoided by the boom back stop means of the embodiment which is very simple and inexpensive and does not involve a special device.

A pulley block 20 is attached to the distal end of the boom 4 through a cross-bar-shaped breaking universal joint (hereinafter simply referred to as "universal joint") 19. In the universal joint 19, a pin 21 (shown in FIG. 4) for coupling the upper end of a universal joint body 19a to the boom 4 is one of the skew cross bars which serves as a fulcrum for the pulley block 20 when the pulley block 20 tilts in the back and forth directions of the boom 4. A pin 22 for coupling the lower end of the universal joint body 19a to a load sheave block 24 (described later) is the other skew cross bar which serves as a fulcrum for the pulley block 20 when it tilts in the right and left directions of the boom 4.

The pulley block 20 is composed of a load sheave block 24 having a plurality of load sheaves 23 which function as fixed pulleys and a hook block 26 having a plurality of hook sheaves 25 which function as movable pulleys. In the first embodiment, the hoist hook (hoisting accessory) 27 is suspended from the lower end of the hook block 26 with the aid of the wire rope 14 which extends from the hoist 15 and is wound around the load sheaves 23 and the hook sheaves 25 a plurality of times. By winding and unwinding the wire rope 14 with the hoist 15, the hoisted load (e.g., a short pipe 36 and a long pipe 38) hung by the hoist hook 27 with the aid of a binding member T is raised or lowered.

The path for the wire rope 14 extending from the hoist 15 to the pulley block 20 is located at the right of the operator's seat 13 (cab 12) such that the operator can watch the movement of the wire rope 14. Thus, the operator can obtain the amount of raising/lowering the hoisted load through visual estimation of the amount of winding and unwinding the wire rope 14 by the hoist 15, so that the height of the hoisted load can be easily adjusted.

Disposed in the middle of the path for the wire rope 14 extending from the hoist 15 to the pulley block 20 are a first guide sheave 28 and a second guide sheave 29 which are for guiding the wire rope 14. The first and second guide sheaves 28, 29 are supported by brackets 30 and 31, respectively, which are fixedly mounted on the turning frame 9 of the upper revolving superstructure 3. The first guide sheave 28 is disposed on the right of the operator's seat 13 (cab 12) at such a level that the operator can visually check it. Thus, the operator can estimate the amount of raising and lowering the hoisted load from the amount of peripheral movement of the first guide sheave 28 and the moving amount of the wire rope 14 to more accurately adjust the height of the hoisted load. For ensuring further accuracy, the first guide sheave 28 may be provided with a display unit (not shown) composed of an indicator, scale marks and others. The second guide sheave 29 is located under the proximal end of the boom 4 such that the wire rope 14 from the first guide sheave 28 passes through under the lower face of the boom 4, going to the pulley block 20. Where there is the possibility that the fleet angle between the first guide sheave 28 and the drum of the hoist 15 might exceed 1.5° (or 2°), the first guide sheave 28 may be disposed so as to be slidable in its thrusting direction.

The pipelayer 1 of the first embodiment is provided with an over load protection system (moment limiter) not shown. Although a detailed illustrative description on the over load protection system is skipped herein, the over load protection system is designed as follows: A load imposed at the time of hoisting operation (i.e., actual load) is calculated based on axle load data calculated from pressure detection data from pressure sensors for detecting the pressures of the oil chambers on the head side and bottom side of the boom cylinders 18 respectively and based on boom angle detection data from a boom angle detector for detecting the tilt angle of the boom 4. This actual load is compared to a rated total load and if the actual load reaches a specified percent (e.g., 90%) of the rated total load, a warning means is actuated. It should be noted that since the detection of the hydraulic pressures by the pressure sensors is relatively easy and therefore the over load protection system can be easily constructed.

Figure 5:
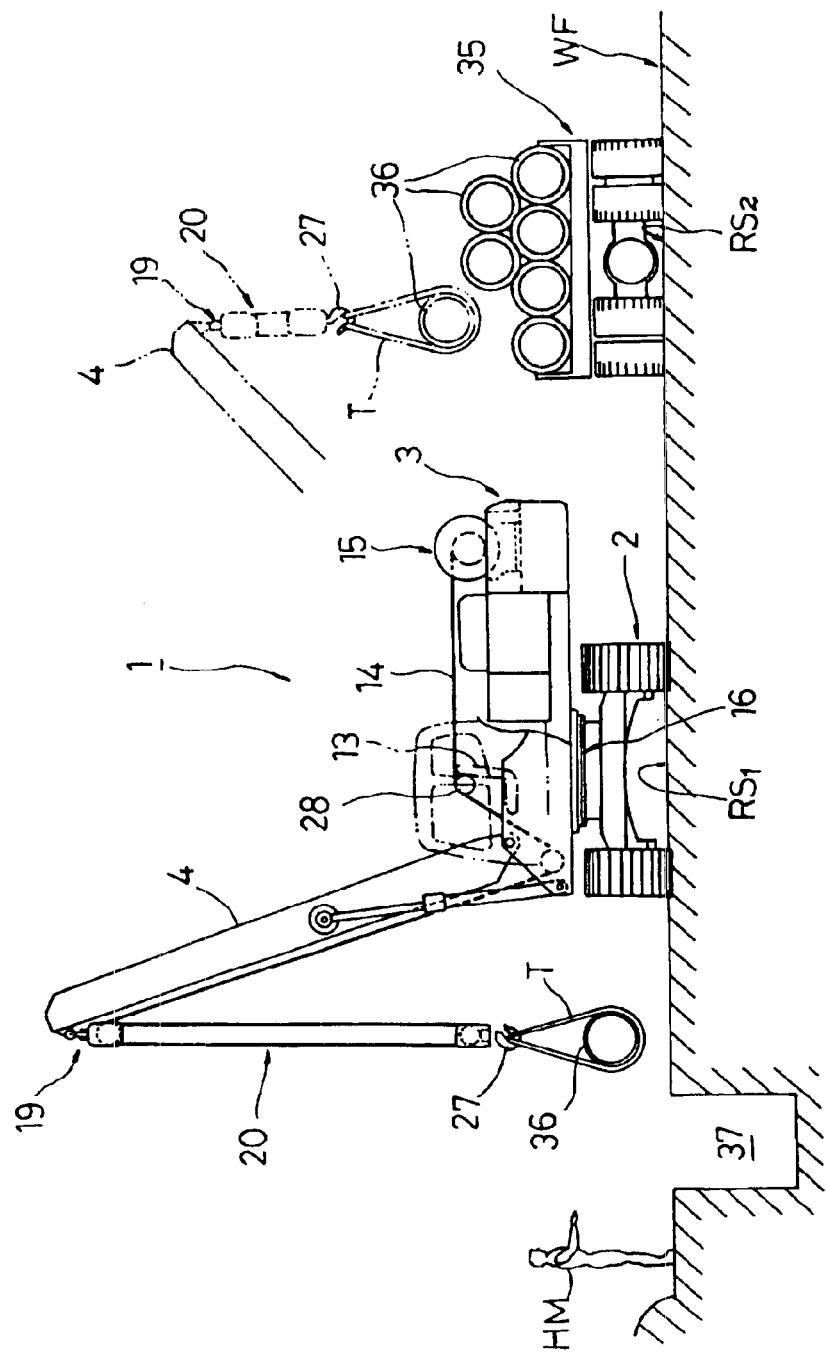
FIG. 5 is a diagram showing how a short pipe transporting operation is carried out in a pipeline laying step.
Figure 6:
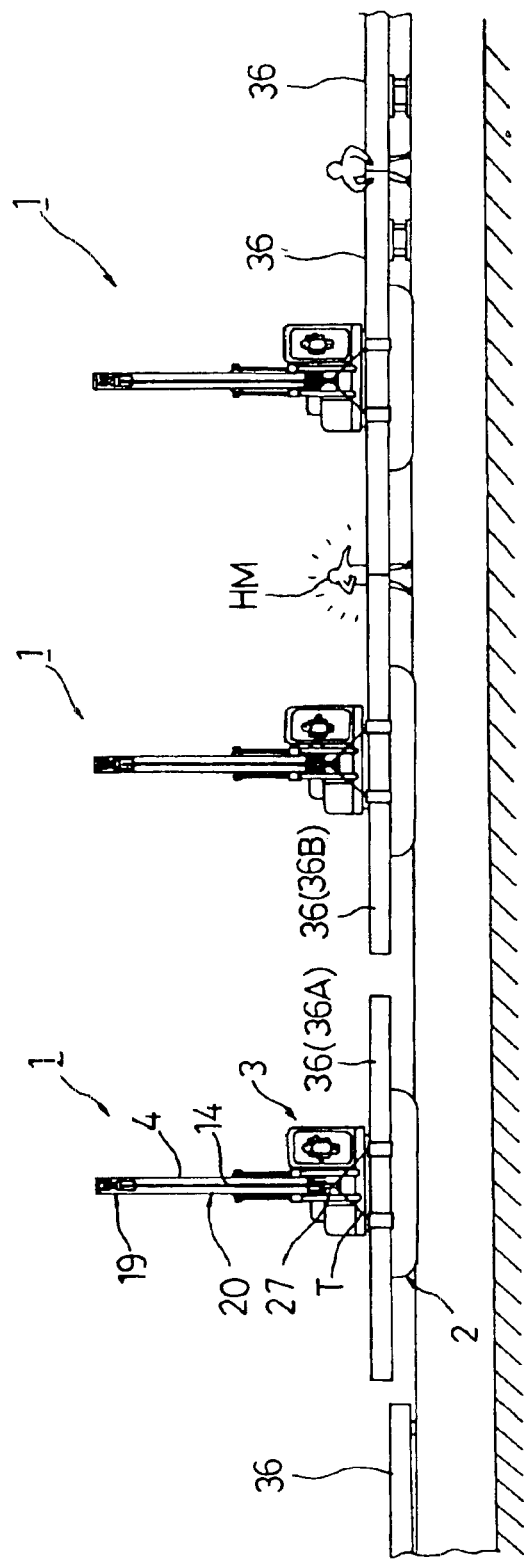
FIG. 6 is a diagram showing how a first centering operation is carried out during a short pipe joining operation in the pipeline laying step.
Figure 7:
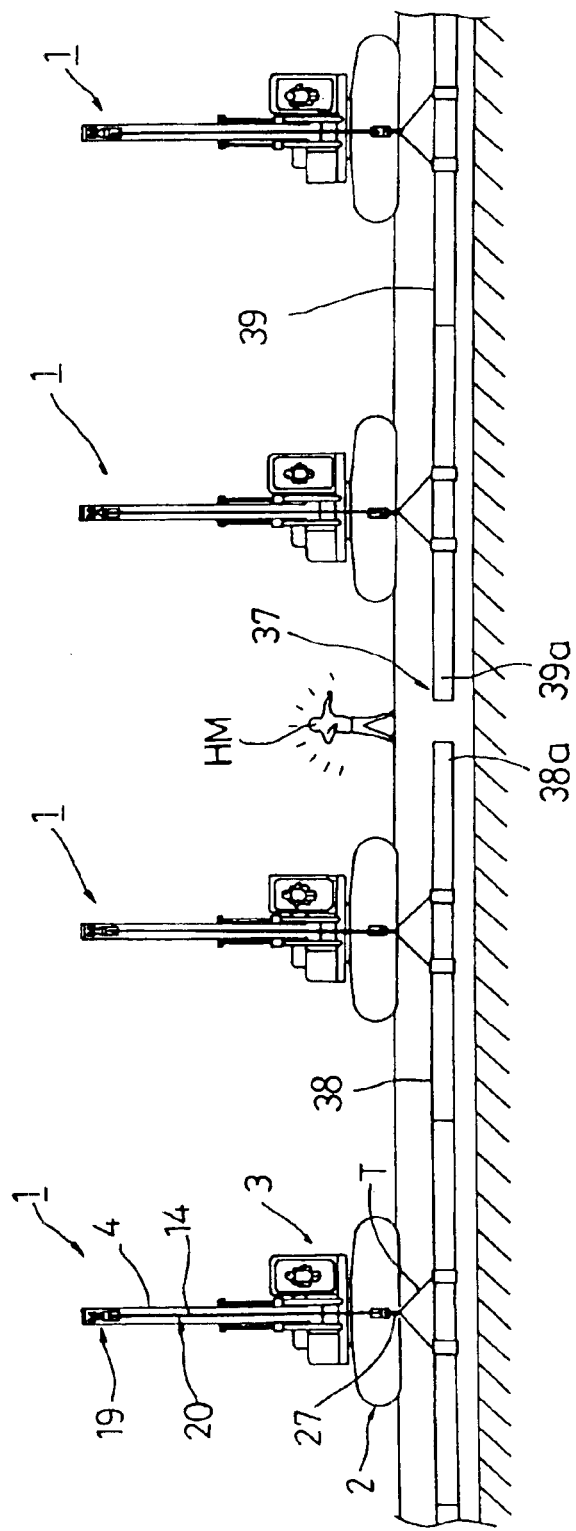
FIG. 7 is a diagram showing how a second centering operation is carried out during a long pipe joining operation in the pipeline laying step.
Figure 8:
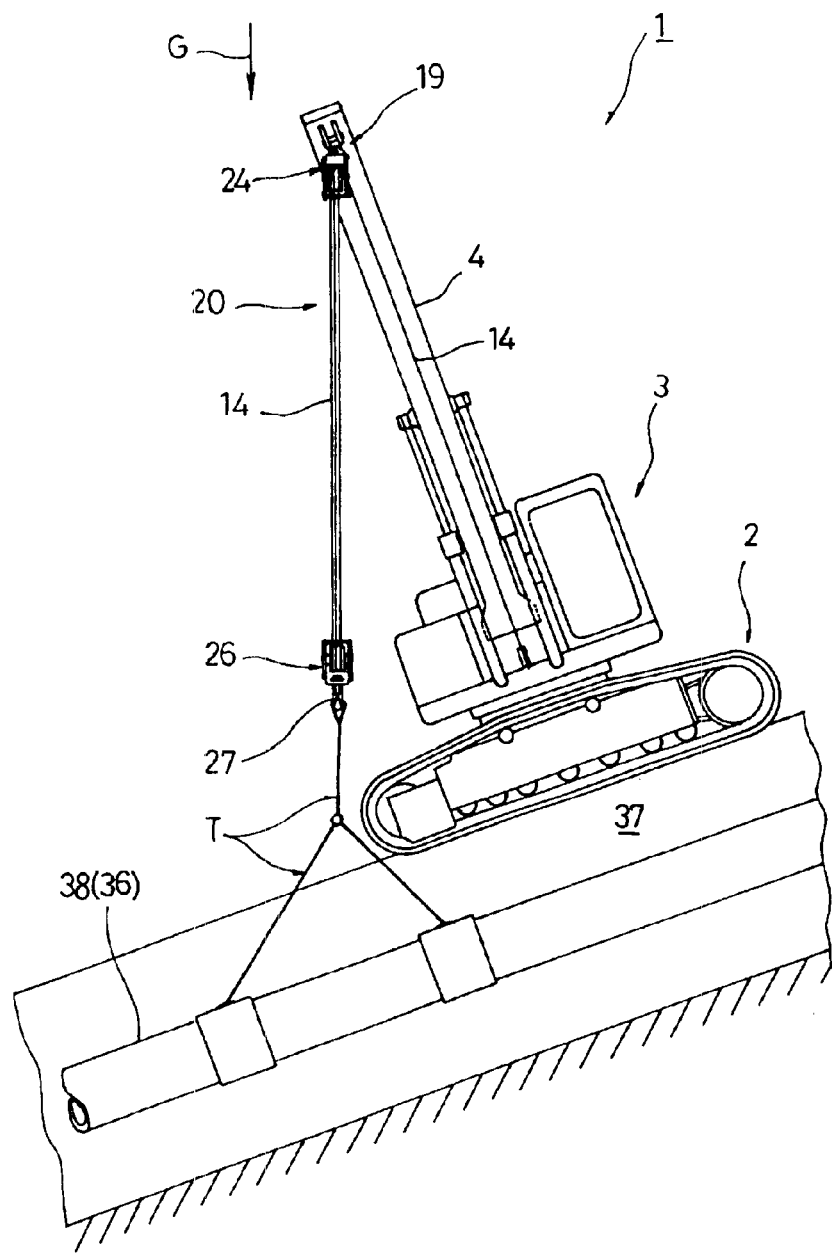
FIG. 8 is a diagram showing how the second centering operation is carried out on a slope.

Next, reference is made to FIGS. 5 to 8 for describing the content of the operation performed in the pipeline laying step by the pipelayer 1 of the first embodiment having the above-described structure. FIG. 5 shows how a short pipe transporting operation is carried out in the pipeline laying step. FIG. 6 shows how a first centering operation is carried out during a short pipe joining operation in the pipeline laying step. FIG. 7 shows how a second centering operation is carried out during a long pipe joining operation in the pipeline laying step. FIG. 8 shows how the second centering operation is carried out on a slope.

In the pipeline laying step, the following operations are repeated: (a) short pipe transporting operation: short pipes 36 stacked on a material handling vehicle 35 are moved to a place near a trench 37 and arranged in a line; (b) short pipe joining operation: an adequate number of short pipes 36, which have been aligned in the place near the trench 37 by the short pipe transporting operation, are joined by welding into a long pipe 38; and (c) long pipe joining operation: the long pipe 38 prepared by the short pipe joining operation is joined by welding to the pipeline 39 under construction which has been laid in the previous step.

As shown in FIG. 5, a working field WF is formed in the short pipe transporting operation on the right of the trench 37, which has been dug in the trench digging step, when viewed in an operating direction D (See FIG. 2. This direction is the same as the direction perpendicular to the plane of FIG. 5). In the working field WF, a traveling space $RS_1$ for the pipelayer 1 and a traveling space $RS_2$ for the material handling vehicle 35 are arranged in this order from the side of the dug trench 37, so that the pipelayer 1 and the material handling vehicle 35 can travel together in the operating direction D in parallel with the dug trench 37. After the self-propulsion of the undercarriage 2 allows the pipelayer 1 to move the distance corresponding to the planned pitch of alignment of the short pipes 36 in the operating direction D, the upper revolving superstructure 3 turns about to take one of the short pipes 35 out of the material handling vehicle 35 and place it near the dug trench 37. By repeating this operation, all the short pipes 36 stacked on the material handling vehicle 35 are moved to and aligned in the place near the dug trench 37.

In the short pipe joining operation, as shown in FIG. 6, the short pipes 36 aligned in the place near the dug trench 37 are raised to a level suited for welding operation and the first centering operation is performed to make the central axes of the adjacent short pipes 36A, 36B coincident with each other. The first centering operation is performed by cooperation of a plurality of pipelayers 1 based on an instruction from the hoistman HM.

In the long pipe joining operation, as shown in FIG. 7, the end to be joined 38a of the long pipe 38 and the end to be joined 39a of the pipeline 39 under construction are raised to a level suited for welding operation and the second centering operation is performed to make the central axes of the ends 38a and 39a coincident with each other. The second centering operation is also performed by cooperation of a plurality of pipelayers 1 based on an instruction from the hoistman HM.

If the first and second centering operations are carried out on a slope, these operations proceed as shown in FIG. 8. Concretely, while the main components from the undercarriage 2 to the boom 4 are tilted, the pulley block 20 and the hoist hook 27 located under the universal joint 19 are vertically suspended in a gravity working direction G owing to the function of the universal joint 19.

According to the present embodiment, the short pipe transporting operation can be effectively carried out by virtue of the self-propulsion of the undercarriage 2 and the turning movement of the upper revolving superstructure 3. Even when the load hoisting operation is carried out on a slope, the winding condition of the wire rope 14 can be properly maintained without deflection of the wire rope 14 from the pulley block 20 owing to the function of the universal joint 19, so that the load hoisting operation on the slope can be stably done.

Figure 9:
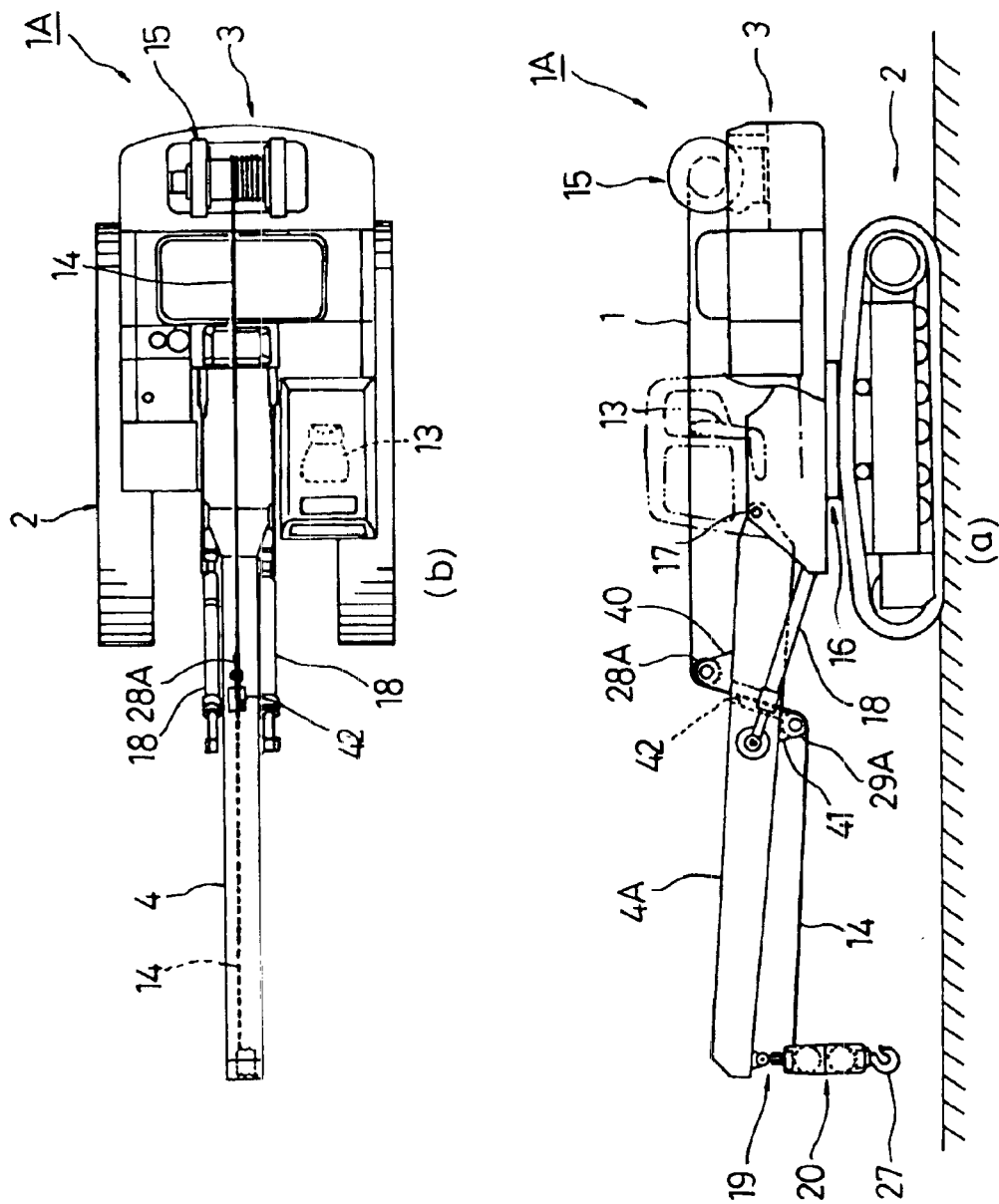
FIGS. 9(a), 9(b) are a side view and plan view, respectively, showing a modification of the pipelayer of the first embodiment of the invention.

The first guide sheave 28 and second guide sheave 29 of the first embodiment may be disposed as shown in FIG. 9 (in which the parts similar to those of the first embodiment are designated by the same reference numerals). In FIG. 9, a first guide sheave 28A is supported by a bracket 40 that is projectively attached to the upper face of the boom 4, being placed slightly away from the center of the boom 4 to the proximal end of the boom 4. A second guide sheave 29A is supported by a bracket 41 that is projectively attached to the underside of the substantial center part of the boom 4. The wire rope 14 guided from the first guide sheave 28A to the second guide sheave 29A is inserted into an opening 42 defined in the boom 4.

Figure 10:
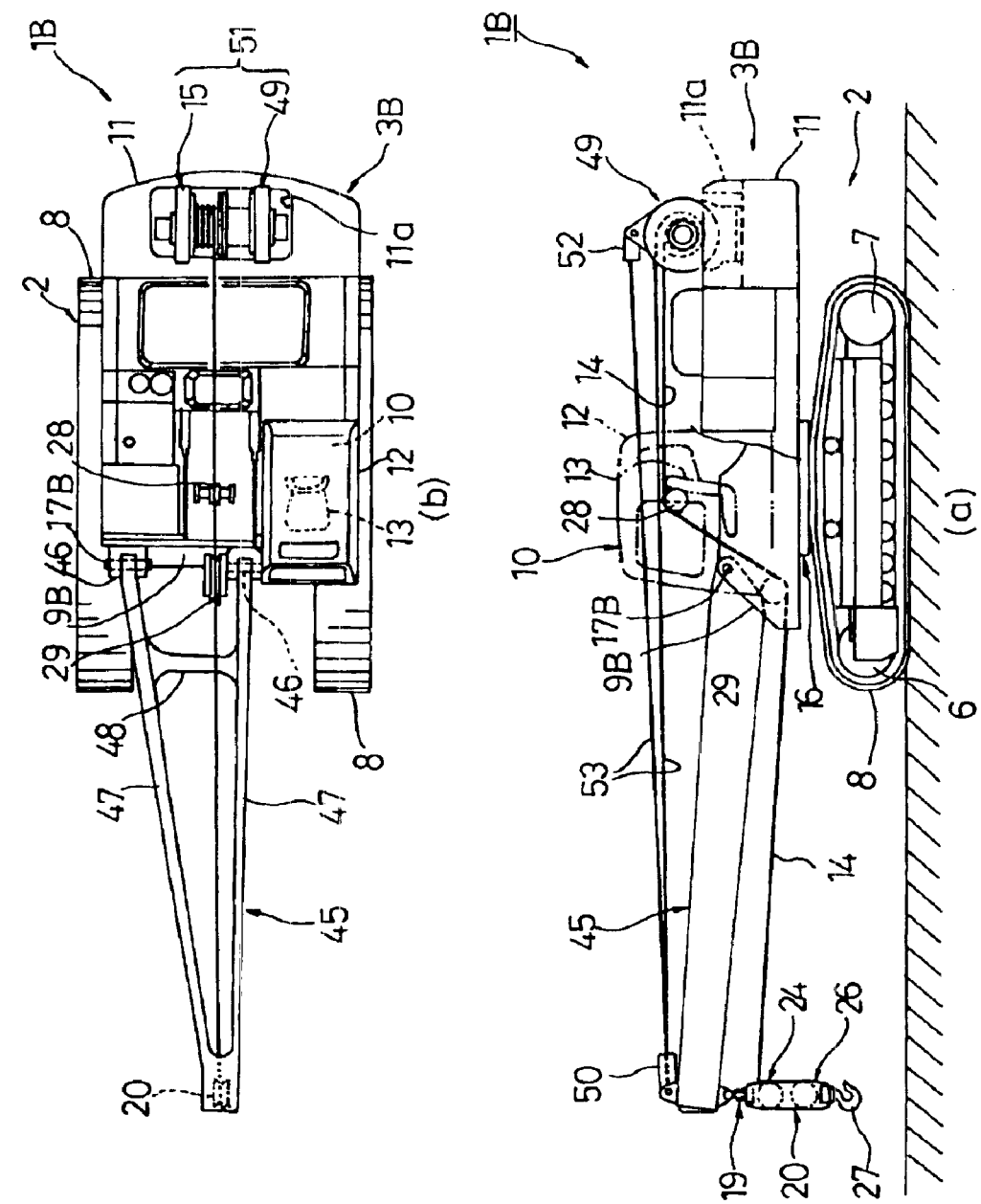
FIGS. 10(a), 10(b) are a side view and plan view, respectively, showing a pipelayer according to a second embodiment of the invention.
Figure 11:
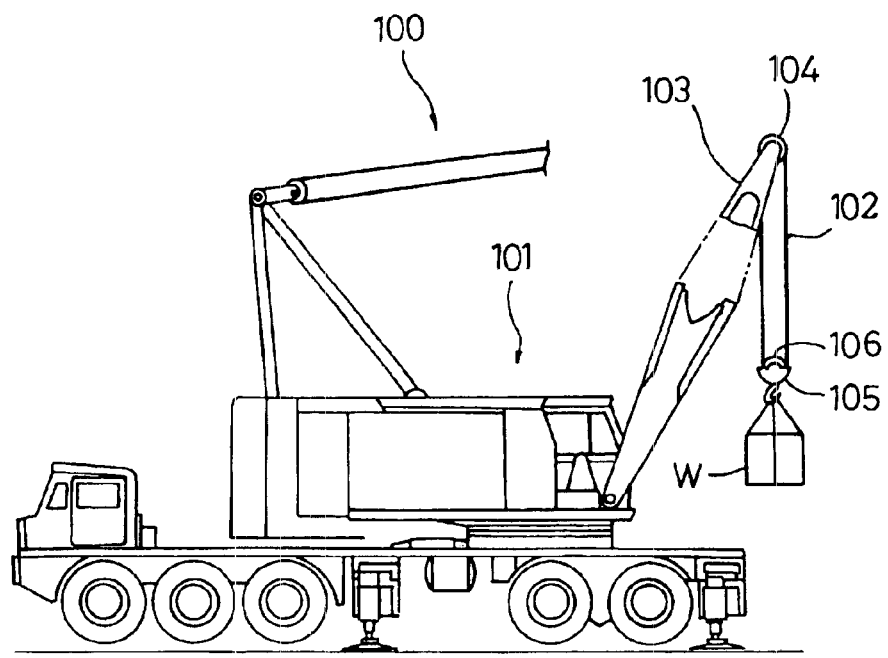
FIG. 11 shows one example of conventional mobile cranes serving as a pipelayer.

Next, there will be explained a pipelayer according to a second embodiment. FIGS. 10(a), 10(b) are a side view and plan view, respectively, showing the pipelayer according to the second embodiment of the invention. The parts similar to those of the first embodiment will be given the same reference numerals as of the first embodiment and will not be explained in detail. Only the parts inherent to the second embodiment will be described below.

In the second embodiment, a boom 45 is formed such that the distal ends of a pair of tubular members 47 are coupled to each other whereas the proximal ends of the tubular members 47 are coupled to brackets 46 respectively by use of boom foot pins 17B, the brackets 46 being formed on a turning frame 9B of an upper revolving superstructure 3B. The tubular members 47 are coupled to each other at the desired parts thereof by a transverse member 48. A boom derricking system for raising and lowering the boom 45 has (i) a boom derricking hoist 49 having basically the same structure as that of the hoist 15; (ii) a first sheave block 50 (not shown in FIG. 10(*b*)) attached to the top of the boom 45 and composed of a plurality of sheaves; (iii) a second sheave block 52 (not shown in FIG. 10(*b*)) that is attached to a single-winch and double-coaxial-type hoist 51 constituted by a combination of the hoist 15 and the boom derricking hoist 49 and that is composed of a plurality of sheaves. This boom derricking system is formed such that a wire rope 53 (not shown in FIG. 10(*b*)) extending from the boom derricking hoist 49 is wound around the first and second sheave blocks 50, 52 a plurality of times and such that the boom 45 is raised or lowered by winding or unwinding the wire rope 53 with the boom derricking hoist 49. In the second embodiment, there is provided a restricting means for restricting the operation of the boom 45 when it is about to rise to more than an allowable angle. In the over load protection system employed in the second embodiment, tension data on the wire rope 53 for derricking the boom 45 is used instead of axle load data on the boom cylinders 18 used in the first embodiment. With the pipelayer 1B of the second embodiment thus arranged, basically the same effect as of the first embodiment can be achieved.

What is claimed is:

1. A pipelayer comprising:

an undercarriage;

an upper revolving superstructure mounted on the undercarriage so as to turn around freely upon the undercarriage;

a boom supported by the upper revolving superstructure so as to be freely raised and lowered;

a pulley block attached to the boom through a universal joint;

a hoist mounted on the upper revolving superstructure; and a hoisting accessory hung by a wire rope that is paid out from the hoist and wound around the pulley block.

2. The pipelayer according to claim 1, wherein a fulcrum of the boom relative to the upper revolving superstructure is located in front of an operator's seat installed in the upper revolving superstructure.

3. The pipelayer according to claim 1, wherein the boom has a single tubular-box-type structure.

4. The pipelayer according to claim 3, wherein a fulcrum of the boom relative to the upper revolving superstructure is located in front of an operator's seat installed in the upper revolving superstructure.

5. The pipelayer according to claim 1, wherein a derricking system for the boom raises and lowers the boom through expansion and contraction of hydraulic cylinders.

6. The pipelayer according to claim 1, wherein a path for the wire rope is provided on a side of an operator's seat installed in the upper revolving superstructure.

7. The pipelayer according to claim 6, further comprising guide sheaves for guiding the wire rope which are provided on a side of the operator's seat.

8. The pipelayer according to claim 1, wherein the hoist is provided at a rear end of the upper revolving superstructure.

* * * * *